United States Patent
Flashinski

(10) Patent No.: US 7,046,920 B2
(45) Date of Patent: May 16, 2006

(54) MULTI-STAGE DISPENSING MAT

(75) Inventor: Stanley J. Flashinski, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 130 days.

(21) Appl. No.: 10/828,365

(22) Filed: Apr. 20, 2004

(65) Prior Publication Data

US 2005/0232615 A1    Oct. 20, 2005

(51) Int. Cl.
*A61M 16/00*  (2006.01)
*A61L 9/04*   (2006.01)

(52) U.S. Cl. ........................ 392/390; 239/56

(58) Field of Classification Search ............... 392/386, 392/387, 390, 391, 392, 393, 394, 395; 239/34, 239/44, 53, 56, 60; 422/120, 125; 428/35.4, 428/36.6, 36.7
See application file for complete search history.

(56) References Cited

U.S. PATENT DOCUMENTS

| | | | |
|---|---|---|---|
| 3,075,362 A | | 1/1963 | Hoyer |
| 4,094,119 A | | 6/1978 | Sullivan |
| 4,145,001 A | * | 3/1979 | Weyenberg et al. .......... 239/56 |
| 4,597,218 A | | 7/1986 | Friemel |
| 4,695,434 A | * | 9/1987 | Spector ...................... 422/116 |
| 5,230,867 A | * | 7/1993 | Kunze et al. ............... 422/123 |
| 6,551,560 B1 | | 4/2003 | Flashinski et al. |
| 6,713,024 B1 | * | 3/2004 | Arnell et al. ............... 422/124 |

FOREIGN PATENT DOCUMENTS

| EP | 238983 | 9/1987 |
|---|---|---|
| WO | WO 2004/073399 | 9/2004 |

OTHER PUBLICATIONS

Flashinski, Stanley J., Baygon Chip description and picture.

* cited by examiner

*Primary Examiner*—Sang Y. Paik

(57) ABSTRACT

Disclosed herein are mats for dispensing volatile materials. A mat of the present invention includes a moat on an upper surface of the mat defining a first mat portion and a second mat portion, preferably connected at the bottom of the moat. Both portions are impregnated with the same or different volatiles. The moat is formed by pressing the upper wall of the mat with a hot forming die. While pressed against the upper wall, the hot die melts the mat material leading to the close of the pores in the material and as a result, a barrier along moat walls is formed. The moat and barrier act to prevent or reduce bleeding of the volatiles between two portions of the mat. The mat provides for both instant burst of volatile and then a sustained vaporization of volatile. Methods for making and using the mat are also disclosed.

15 Claims, 2 Drawing Sheets

MULTI-STAGE DISPENSING MAT

CROSS-REFERENCE TO RELATED APPLICATIONS

Not applicable.

STATEMENT REGARDING FEDERALLY SPONSORED RESEARCH/DEVELOPMENT

Not applicable.

BACKGROUND OF THE INVENTION

The present invention relates to dispensing volatile materials such as insecticides, insect repellants, fragrances, and deodorizers. It provides mats designed to be placed on a heater to release the volatile material when the mat is heated.

It is known to impregnate or coat a solid porous mat, including a plastic mat, with a volatile material, and/or to place a volatile material in a metal pan-like structure. These structures are then placed on heaters to cause the volatile to vaporize into the ambient air. See generally U.S. Pat. No. 6,031,967 and WO 99/66791. The disclosure of these publications, and of all other publications referred to herein, are incorporated by reference as if fully set forth herein.

However, there can be a time lag between the initiation of the heating of the mat and when the concentration of active in the room reaches a desired level. For example, when the mat contains an insecticide, it may take a few minutes before the desired level of protection from mosquitoes or other insects is achieved. This is a particular problem where the product is primarily designed to provide a prolonged release of active (e.g. to provide overnight protection against mosquitoes).

To minimize the time lag, one could try increasing the concentration of active in the mat. However, actives are often costly, and in any event the increased concentration may lead to unnecessarily high levels of insecticide or other active being dispensed into the air after the initial period.

Another approach would be to modify heaters so that they work at one temperature during an initial phase and then work at a reduced temperature at all other times. However, much of the public is unlikely to want to throw away their existing heaters and pay the cost of new ones having this capability. In any event, including this capability in future heaters would unnecessarily increase the cost of such heaters.

U.S. Pat. No. 5,657,574 proposed a mosquito coil having a uniform concentration of insect control agent spread throughout it, but with the coil having an enlarged ignition end. When the coil was first lit an extra burst of insecticide was dispensed because more of the coil was burnt at that time. However, this approach is not suitable for a mat where the entire bottom of the mat is designed to be exposed to the heat source at once.

WO 99/66791 provided a slab-type mat for insertion in an indexed fashion into a heater. Discrete regions of the mat are heated in sequence. The primary purpose of the slab is to provide a mechanism for indexing a new mat section over the heater when the preceding section had been used up. However, the publication also describes that the sequential regions could carry different volatile ingredients or different concentrations of the same volatile ingredient. One example that is given is providing a high concentration section to be used at night and a low concentration section to be used during the day. Unfortunately, this approach requires the user to sequentially move the slab when the next stage of usage is desired.

U.S. Pat. No. 6,551,560 disclosed a mat comprising an outer mat and a central lower section separated by a vertical groove extending through the mat. Different insecticides, or different concentrations of actives, could be provided in each of the two cellulosic sections. The central section was typically heated more quickly (as low cost heaters, such as those typically used in developing countries, often heat the hottest near the center of the heater). As a result, the insecticide in the central portion was dispersed more quickly, while that in the outer mat was dispersed more slowly.

These mats were somewhat difficult to manufacture because the material had to be cut entirely through, resulting in multiple pieces needing to be assembled. This added to the cost of production.

U.S. Pat. No. 4,439,415 described a substrate for dispensing insecticidal vapors having distinct regions impregnated with different insecticides or other volatiles. The distinct regions were provided either on a single substrate with the sections separated by a substance for rendering the material non-absorptive, or were constructed from different pieces of substrate which were coupled together. The device again required multiple parts.

GB 2,122,903 taught a substrate having an aluminum foil bottom layer on which one or more paper segments were mounted. The segments were divided by separators, which were constructed of rubber or synthetic resins which prevented permeation of liquid. Therefore, different volatiles could be provided on the segments without having a volatile from a first segment move to a second segment. This method also required difficult manufacturing steps.

Accordingly, a need still exists for improved volatile dispensing mats.

BRIEF SUMMARY OF THE INVENTION

The present invention provides a mat for dispensing volatile vapors when heated. The mat comprises a porous substrate having a moat in an upper wall of the substrate formed by pressing the upper wall of the substrate with a hot forming die. The moat preferably does not extend through the bottom of the substrate such that the substrate remains a single piece of material. The moat defines a first substrate portion and a second substrate portion, preferably connected at the bottom of the moat. The first substrate portion has applied thereto a first volatile material, the volatile material comprising an active selected from the group consisting of insect control agents, fragrances, deodorizers, and combinations thereof. The second substrate portion has applied thereto a second volatile material, the volatile material comprising an active selected from the group consisting of insect control agents, fragrances, deodorizers, and combinations thereof. Preferably, the moat is positioned radially outward of the first substrate portion and the second substrate portion is positioned radially outward of the moat.

The term "mat" is used herein to include any structure suitable for use with conventional vapor dispensers, regardless of the precise shape. Slab-like mats are preferred.

The term "insect control" is defined to mean killing, repelling, or otherwise altering the behavior or development of insects. "Insect control agent" is used herein in its broadest sense to include not only insecticides and repellants but also growth regulators and other agents capable of achieving insect control. "Insect" is defined to mean actual insects as well as spiders, millipedes, and other small animals commonly controlled in the same manner or with the same agents as are insects.

The substrate employed for making the mat of the present invention is a porous material suitable for retaining volatile materials. Further, the material is sufficiently heat sensitive so as to melt when contacted by a hot forming die but also sufficiently heat resistant so as to be essentially resistant to melting in the presence of heat from a heater such as a conventional electric heater. For example, most heaters on the market do not generate heat in excess of the 160° C. to 180° C. range, many heating to about 160° C. and some heating closer to 180° C. Thereby, materials that are essentially resistant to melting at a temperature of 160° C. or less, or 180° C. or less, but melt to form a moat when pressed by a hot forming die at a higher temperature such as 200° C. and above, are suitable materials. In one embodiment, the mat of present invention is made of a plastic material. Examples of plastic materials that can be used include but are not limited to polyethylene.

The first volatile material applied to the first portion of the mat can be the same as or different from the second volatile material applied to the second portion of the mat. For the latter, the first volatile material can have an active that is not present in the second volatile material, or the second volatile material can have an active that is not present in the first volatile material. Alternatively, one can provide the first volatile material with at least one active that is the same as an active in the second volatile material, but that active is present at different concentrations in the first volatile material than in the second volatile material (typically higher in the first volatile material). As yet another alternative, the first volatile material can have at least one active that is the same as an active in the second volatile material, but the remainder of the first volatile material may not be entirely identical to the remainder of the second volatile material.

In an insect control application, we prefer to use the first portion to disperse an insect control material quickly to achieve immediate control and the second portion to disperse an insect control material more slowly for sustained control. One strategy is to provide high heat to the first portion and lower heat to the second portion. In this regard, a mat with a centrally located first portion is preferred because such a mat can be used with most existing heaters which heat the hottest near the center. Other strategies (alternative or additional) include retarding or increasing the rate of release by the selection of suitable solvents, binders, actives, and active concentrations as exemplified in U.S. Pat. No. 6,551,560, incorporated herein by reference as if set forth in its entirety.

Another form the invention provides a method for controlling insects. One places such a mat of the present invention on a heater, and then heats the mat to thereby cause the first and second volatile materials to be dispensed from the mat.

In yet another form of the invention there is provided a method of constructing such a dispensing mat. One obtains a slab of a substrate material. One then compresses a portion of the slab with a hot forming die to form a moat wherein the moat defines a first slab portion and a second slab portion, preferably connected at the bottom of the moat. One then deposits a first volatile material in the first portion of the mat, and deposits a second volatile material in the second portion of the mat. The moat acts to minimize bleed between the two portions of the mat (e.g. while the mat is being stored for shipment, inventory, or store display).

When used as an insect control device, the device of the invention allows the user to achieve desired protection very quickly, without sacrificing long-term protection. When dispensing a deodorizer or fragrance, the invention has the advantage of covering over existing malodors very quickly (e.g. in a bathroom), without sacrificing the ability to provide fragrance over the long term.

The present invention is further capable of turning a disadvantage of inexpensive heaters (non-uniform heating across the heating face) into an advantage. This is achieved by centrally placing the fast release portion.

These advantages are achieved while permitting a very efficient manufacturing process to be able to produce the item. A low cost hot forming die stamping operation can quickly form the moat. When the hot forming die is pressed against the upper wall of the substrate for forming the moat, it melts the substrate leading to the close of the pores in the substrate and thus the formation of a barrier along the walls of the moat. The barrier can prevent or reduce bleeding between the volatile material in the first substrate portion and the volatile material in the second substrate portion. Therefore, a mat with chemically separated regions is made without involving the assembly of multiple parts and/or the use of a moat filler as a separator to prevent bleeding.

These and still other advantages of the present invention will appear from the following description. In that description reference is made to the accompanying drawings in which there is shown by way of illustration preferred embodiments of the invention. However, the claims should be looked to in order to judge the full scope of the invention.

DETAILED DESCRIPTION OF THE PREFERRED EMBODIMENTS

Figure 1:
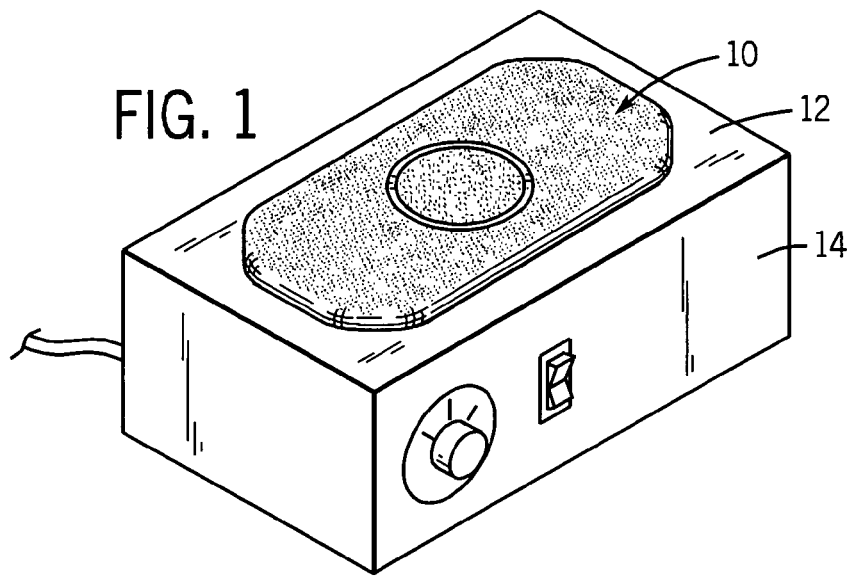
FIG. 1 is a perspective view of a dispensing mat of the present invention which has been positioned on a heater.

Referring first to FIG. 1, a mat 10 is shown placed upon a horizontal burner face 12 of an electric heater 14. The heater 14 can be an electrical-resistance heater, such as the heater sold by as the RAID® heater by S. C. Johnson & Son, Inc. However, other heaters could also be used, including without limitation those with horizontal, vertical, or other orientation of their heating surfaces.

Figure 2A:
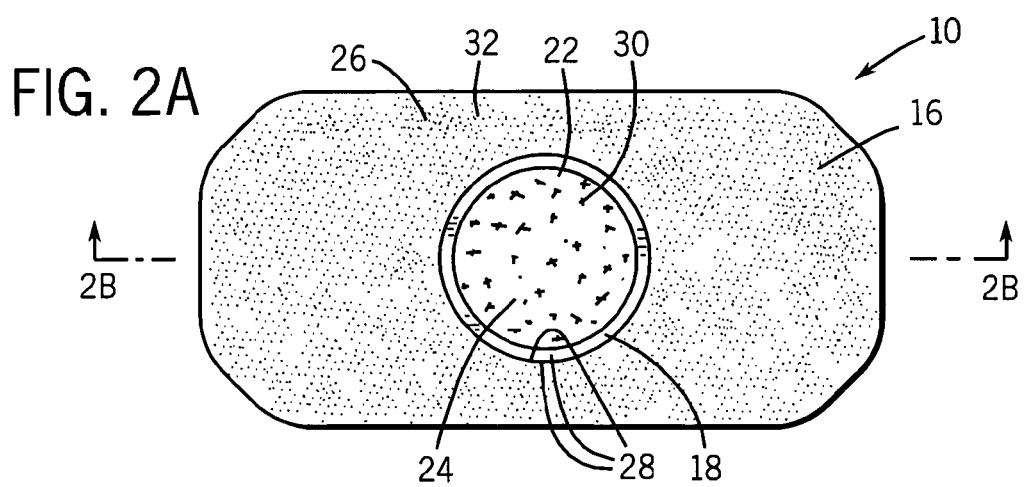
FIG. 2A is a top view of a first embodiment of a two-stage mat of the present invention.
Figure 2B:
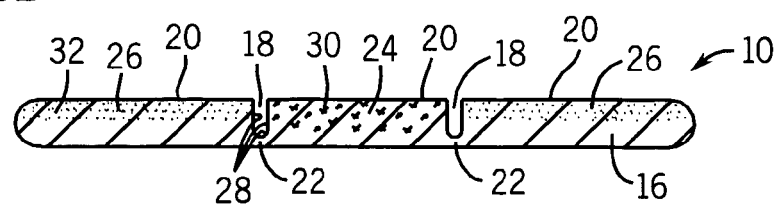
FIG. 2B is a cross-sectional view taken along line 2—2 of FIG. 2A.

A first preferred embodiment of the mat is shown in other views in FIGS. 2A and 2B. Mat 10 includes a slab-like body 16 made of a porous material suitable for retaining volatile materials. Further, the porous slab material is sufficiently heat sensitive so as to melt when contacted by a hot forming die but also sufficiently heat resistant so as to not significantly melt in the presence of heat from heater 14. Slab-like body 16 has a circular moat 18 on upper surface 20 formed by pressing upper surface 20 with a hot forming die (see U.S. Pat. No. 3,075,862 for an example of using a hot forming die to press a plastic material). Moat 18 does not extend through the entire depth of body 16, such that body 16 remains a single piece of material connected at bottom 22 of moat 18. The moat 18 defines a first slab portion 24 and second slab portion 26 connected only at the bottom 22 of moat 18. Each portion can be impregnated with the same or different volatile materials. The volatile materials or formulations may also have distinctly different vaporization rates.

When the hot forming die is pressed against upper wall 20 of slab-like body 16 for forming moat 18, it melts body 16 in areas adjacent to the die, leading to the close of the pores in these areas and thus the formation of a barrier along walls 28 of moat 18. The barrier can prevent or reduce bleeding between the volatile material in the first portion 24 and the volatile material in the second portion 26. Although some slight bleeding between portions 24 and 26 through moat bottom 22 is still possible, this bleeding can be minimized to negligible level if moat bottom 22 is pressed very thin. Preferably, moat bottom 22 is pressed sufficiently thin so that the hot forming die causes some level of melting across the depth of bottom 22 to close sufficient number of pores and stop bleeding through bottom 22 completely.

The first portion 24 and the second portion 26 are impregnated and coated with a first volatile material or formulation 30 and a second volatile material or formulation 32, respectively. When placed over the heater burner face 12, the volatiles are released from the mat 10 (when the mat 10 is heated). Advantageously, the first portion 24 is essentially in the center of the body 16, which takes advantage of the often higher temperatures in the center of the burner surface typically associated with low cost heaters.

Preferably, second portion 26 is impregnated with a second volatile material 32 having a slower releasing active ingredient and the first portion 24 is coated with a chemically distinct first volatile material 30 having a faster releasing active ingredient. As an insect control device, preferably second volatile material 32 is 100 mg of a liquid solution having a chemical composition of 40% d-allethrin (an insecticide active ingredient), 40% piperonyl butoxide (PBO, synergist/release agent), and 20% Isopar M (solvent). First volatile material 30 is preferably 50 mg of a liquid solution having a chemical composition of 4% transfluthrin (insecticide active ingredient) and 96% Isopar E (solvent). Transfluthrin vaporizes more quickly than does the d-allethrin because it has a higher vaporization pressure.

When the mat 10 is heated, it provides for a prompt, initial burst of the first volatile material 30 at startup of the heater 14. It also provides uniform and efficient sustained release of second volatile material 32 for prolonged protection lasting at least 6 to 8 hours and as much as a day or more.

Alternatively, the volatile materials 30 and 32 could be any other suitable known insecticides, repellants, growth regulators, or other insect control agent. For example, the volatile materials 30 and 32 could include organic phosphorus insecticides, lipidamide insecticides, natural repellants such as citronella oil, natural pyrethrum and pyrethrum extract, and synthetic pyrethroids. Suitable synthetic pyrethroids include allethrin as d-allethrin, allethrin, benfluthrin, bifenthrin, S-bioallethrin, esbiothrin, esbiol, bioresmethrin, cycloprothrin, cyfluthrin, beta-cyfluthrin, cyhalothrin, deltamethrin, empenthrin, esfenvalerate, fenpropathrin, fenvalerate, flucythrinate, tau-fluvalinate, kadethrin, permethrin, phenothrin, prallethrin, resmethrin, tefluthrin, tetramethrin or tralomethrin. Other volatile insecticides as described in U.S. Pat. No. 4,439,415 can also be used.

Volatile insect growth control agents such as methoprene and hydroprone may also be used. Alternatively or in addition, fragrances and deodorizers may be used, such as limonene, eucalyptus, and citronella.

In one form, the slab-like body 16 can have a dimension of about 22 mm in width, 35 mm in length, and 2 mm in thickness. The first portion 24 enclosed by moat 18 is centrally located and moat 18 can have an inner diameter of about 9 mm and an outer diameter of about 12 mm. The depth of moat 18 can be about 1.5 to 1.8 mm.

It is noted that moat 18 can assume other configurations such as polygonal configuration, elliptical configuration, and star configuration. It is apparent that a mat with multiple concentric moats, in a "bull's-eye" pattern, could also be provided so as to create three or more different dispensing portions. The color of each of the different mat portions can be separately and differently dyed, such as by including varied dyes in the impregnation materials. Where the dye is also volatile, the change or fading of color can be a use-up cue.

Figure 3A:
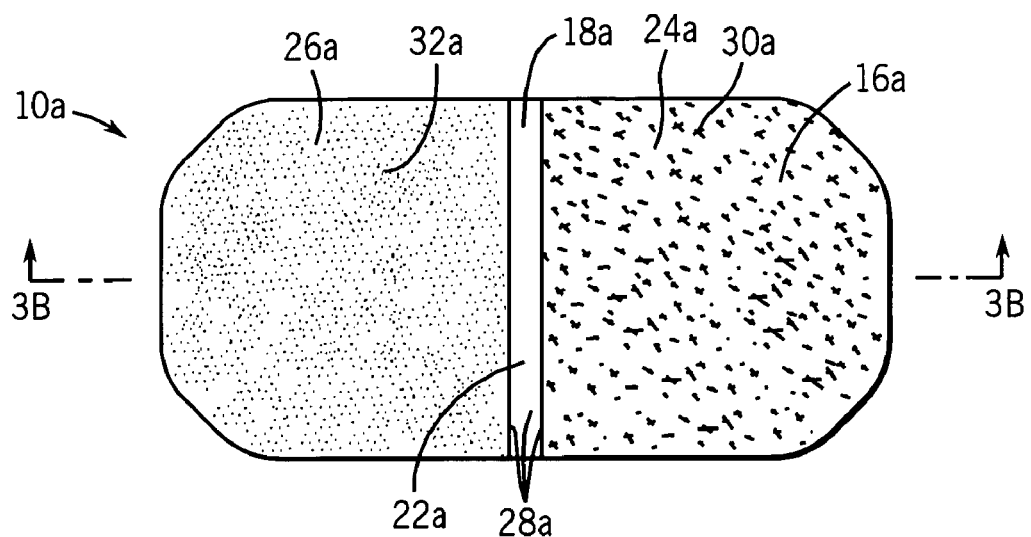
FIG. 3A is a top view of a second embodiment of the present invention.
Figure 3B:
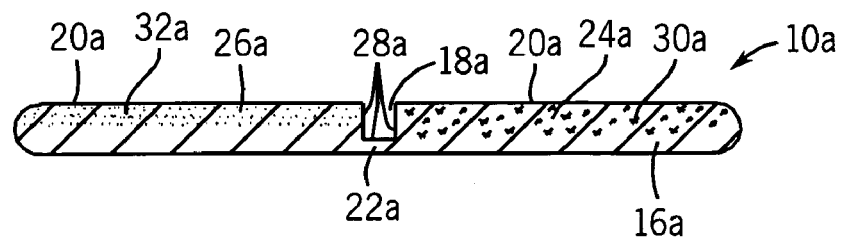
FIG. 3B is a cross-sectional view taken along line 3—3 of FIG. 3A.

FIGS. 3A and 3B illustrate an alternate embodiment of the present invention, wherein similar components are referred to with similar reference numbers, albeit with an "a" suffix. In this embodiment, mat 10a includes a slab-like body 16a having a generally straight moat 18a on and across upper surface 20a of the body 16a formed by pressing the upper surface 20a with a hot forming die. Moat 18a does not extend through the entire depth of body 16a, such that body 16a remains a single piece of material. Moat 18a defines a first slab portion 24a and second slab portion 26a connected only at bottom 22a of moat 18a. Each portion is impregnated with the same or different volatile materials. The materials used to construct mat 10a, including the material for the slab-like body 16a and volatile materials for impregnating portions 24a and 26a are preferably the same as those described above with respect to the first embodiment. Moreover, mat 10a is used in the same manner as the first embodiment, providing for multiple rate vaporization of the volatile materials when sufficiently heated by a heater.

It should be appreciated that the mats of the present invention could be formed in still other embodiments. These are also intended to be within the scope of the present invention.

Moreover, the mat of the present invention could also be a disinfectant/fragrancer/deodorizer, using any of a wide variety of active ingredients for such purposes, including without limitations glycols, trimethylene, and dipropylene known in the art. Further, even with the same active and substrates, a mat constructed in accordance with the present invention could achieve multi-stage release if solvents, binders, and the like were adjusted to suitably control release rates. Accordingly, the claims should be referenced in order to determine the full scope of the invention.

INDUSTRIAL APPLICABILITY

The invention provides mats for the controlled release of insect control agents, fragrances, disinfectants, and similar useful, volatile materials, where a burst of a volatile material occurs when the product is first used, followed by a prolonged release of the same or another volatile.

I claim:

1. A mat for dispensing volatile vapors, comprising:
a substrate having a first substrate portion and a second substrate portion, the first substrate portion having applied thereto a first volatile material, the volatile material comprising an active selected from the group consisting of insect control agents, fragrances, deodorizers, and combinations thereof, and the second substrate portion having applied thereto a second volatile material, the second volatile material comprising an active selected from the group consisting of insect control agents, fragrances, deodorizers, and combinations thereof, wherein the substrate is made of a porous material that is sufficiently heat sensitive so as to melt when contacted by a hot forming die but also sufficiently heat resistant so as to be suitable to be used in the presence of heat from a heater; and a moat which extends at least partially into the substrate and defines the first substrate portion and the second substrate portion, the moat having been formed by pressing a portion of an upper wall of the substrate with a hot forming die;

wherein the active in the first volatile material and the active in the second volatile material are the same, but the first and second volatile materials are differently formulated such that the first volatile material and the second volatile material are released at different rates when the mat is heated; and wherein the moat is positioned radially outward of the first substrate portion and the second substrate portion is positioned radially outward of the moat.

2. The mat of claim 1, wherein the first substrate portion is radially centrally positioned in the substrate.

3. The mat of claim 1, wherein pores along moat walls are closed due to melting of the substrate material caused by the hot forming die, thereby leading to the formation of a barrier along moat walls, which inhibits bleeding of the first volatile material from the first substrate portion to the second substrate portion.

4. The mat of claim 1, wherein the substrate is made of a plastic material.

5. The mat of claim 4, wherein the plastic material is polyethylene.

6. The mat of claim 1, wherein the substrate is made of a material that is sufficiently heat resistant so as to be essentially resistant to melting at a temperature of 160° C. or less.

7. The mat of claim 1, wherein the substrate is made of a material that is sufficiently heat resistant so as to be essentially resistant to melting at a temperature of 180° C. or less.

8. The mat of claim 1, wherein the substrate is made of a material that is sufficiently heat sensitive so as to melt to form the moat when pressed by a hot forming die at an operating temperature of 200° C. and above.

9. A mat for dispensing volatile vapors, comprising:

a substrate having a first substrate portion and a second substrate portion, the first substrate portion having applied thereto a first volatile material, the volatile material comprising an active selected from the group consisting of insect control agents, fragrances, deodorizers, and combinations thereof, and the second substrate portion having applied thereto a second volatile material, the second volatile material comprising an active selected from the group consisting of insect control agents, fragrances, deodorizers, and combinations thereof, wherein the substrate is made of a porous material that is sufficiently heat sensitive so as to melt when contacted by a hot forming die but also sufficiently heat resistant so as to be suitable to be used in the presence of heat from a heater; and a moat which extends at least partially into the substrate and defines the first substrate portion and the second substrate portion, the moat having been formed by pressing a portion of an upper wall of the substrate with a hot forming die;

wherein the first volatile material and the second volatile material are different; and wherein the moat is positioned radially outward of the first substrate portion and the second substrate portion is positioned radially outward of the moat.

10. The mat of claim 9, wherein the first volatile material has an active that is not present in the second volatile material.

11. The mat of claim 9, wherein the second volatile material has an active that is not present in the first volatile material.

12. The mat of claim 9, wherein the first volatile material has at least one active that is the same as an active in the second volatile material but that active is present at a different concentration in the first volatile material than in the second volatile material.

13. The mat of claim 9, wherein the first volatile material has at least one active that is the same as an active in the second volatile material but the remainder of the first volatile material is not completely identical to the reminder of the second volatile material.

14. A method of constructing a dispensing mat, the method comprising:

obtaining a slab of a porous substrate material that is sufficiently heat sensitive so as to melt when contacted by a hot forming die but also sufficiently heat resistant so as to not significantly melt in the presence of heat from a heater;

pressing a portion of the slab with a hot forming die to form a moat wherein the moat extends at least partially into the slab and defines a first slab portion and a second slab portion;

depositing a first volatile material on the first portion of the slab; and depositing a second volatile material on the second portion of the slab;

wherein the first and second volatile materials are different from each other.

15. The method of claim 14, wherein a portion of the slab is pressed with a hot forming diet at an operating temperature at 200° C. or above.

* * * * *